United States Patent
Shi et al.

(10) Patent No.: US 8,150,483 B2
(45) Date of Patent: Apr. 3, 2012

(54) SLIDING MECHANISM AND PORTABLE ELECTRONIC DEVICE HAVING THE SAME

(75) Inventors: Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 951 days.

(21) Appl. No.: 12/146,565

(22) Filed: Jun. 26, 2008

(65) Prior Publication Data
US 2009/0264167 A1    Oct. 22, 2009

(30) Foreign Application Priority Data
Apr. 16, 2008   (CN) .......................... 2008 1 0301145

(51) Int. Cl.
  *H04M 1/00* (2006.01)
  *H04M 1/02* (2006.01)
  *H04M 1/03* (2006.01)
(52) U.S. Cl. .................. 455/575.4; 455/575.1; 455/566; D14/138 R; D14/138 AD; D14/138 G

(58) Field of Classification Search .................. 345/169, 345/184; 361/679.01–679.3, 679.55–679.58; 455/575.1–575.9, 128, 90.3; 379/433.01, 379/433.04, 433.07, 433.12, 433.13, 434
See application file for complete search history.

(56) References Cited

U.S. PATENT DOCUMENTS
2006/0154515 A1 *   7/2006   Seo ............................... 439/500

FOREIGN PATENT DOCUMENTS
CN    1929504 A        3/2007
CN    1953473 A    *   4/2007

* cited by examiner

*Primary Examiner* — Ajit Patel
*Assistant Examiner* — Erica Navar
(74) *Attorney, Agent, or Firm* — Altis Law Group, Inc.

(57) ABSTRACT

A sliding mechanism (40) includes a base plate (42), a first sliding plate (44), as second sliding plate (46), and a elastic element (48). The first sliding plate (44) is slidably mounted on the first sliding plate (44) and located adjacent to one side of the base plate (42). The second sliding plate (46) is slidably mounted on the second sliding plate (46) and located adjacent to an opposite side of the base plate (42). The elastic element (48) provides force for driving the first sliding plate (44) and the second sliding plate (46) to slide relative to the base plate (42) and in opposite directions.

17 Claims, 6 Drawing Sheets

SLIDING MECHANISM AND PORTABLE ELECTRONIC DEVICE HAVING THE SAME

BACKGROUND

1. Field of the Invention

The exemplary invention generally relates to portable electronic devices, and particularly to portable electronic devices having sliding mechanisms.

2. Description of Related Art

With the development of wireless communication, portable mobile terminals, such as mobile phones and personal digital assistants (PDAs), are now in widespread use.

Typical portable electronic devices such as mobile phones mainly include bar mobile phones, foldable mobile phones, and slidable mobile phones, slidable mobile phones have more modern designs.

A typical slidable portable electronic device, such as a mobile phone, generally includes a cover with a display mounted thereon, a base with a keypad mounted thereon, and a sliding mechanism. The cover is slidably mounted on the base by a sliding mechanism. However, the cover generally can only slide relative to the base along one direction. Thus, only one side of the base can be exposed, and the keypad can only be at the exposed side of the base. As a result, there is less area available for keys.

Therefore, there is room for improvement within the art

BRIEF DESCRIPTION OF THE DRAWINGS

Many aspects of the exemplary sliding mechanism and a portable electronic device employing the same can be better understood with reference to the following drawings. The components in the various drawings are not necessarily drawn to scale, the emphasis instead being placed upon clearly illustrating the principles of the exemplary sliding mechanism and a portable electronic device employing the same. Moreover, in the drawings, like reference numerals designate corresponding parts throughout the diagrams.

DETAILED DESCRIPTION OF THE EXEMPLARY EMBODIMENT

The exemplary sliding mechanism is suitable for portable electronic devices, such as mobile phones, digital cameras, and so on.

Figure 1:
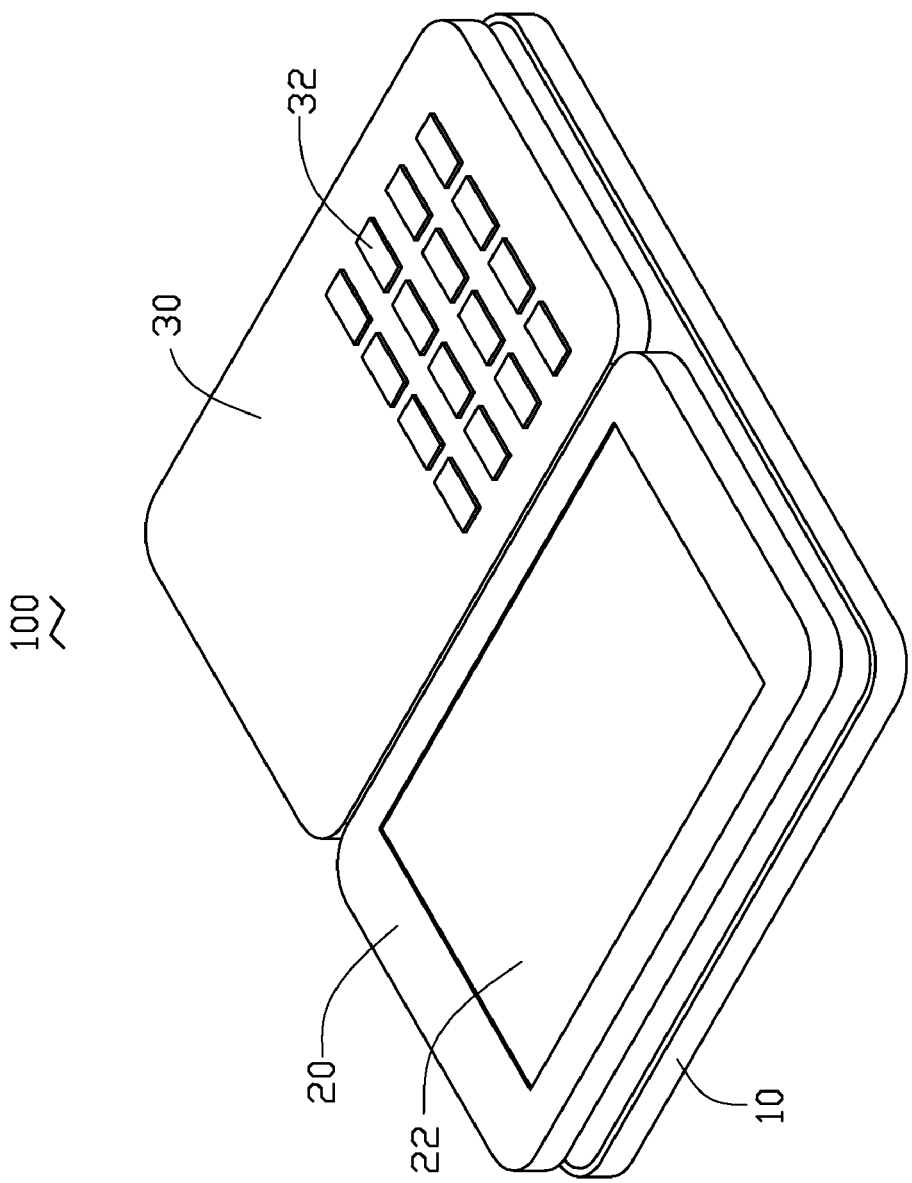
FIG. 1 is a schematic, perspective view of a exemplary portable electronic device employing a sliding mechanism according to an exemplary embodiment, wherein the portable electronic device is in a closed status.
Figure 2:
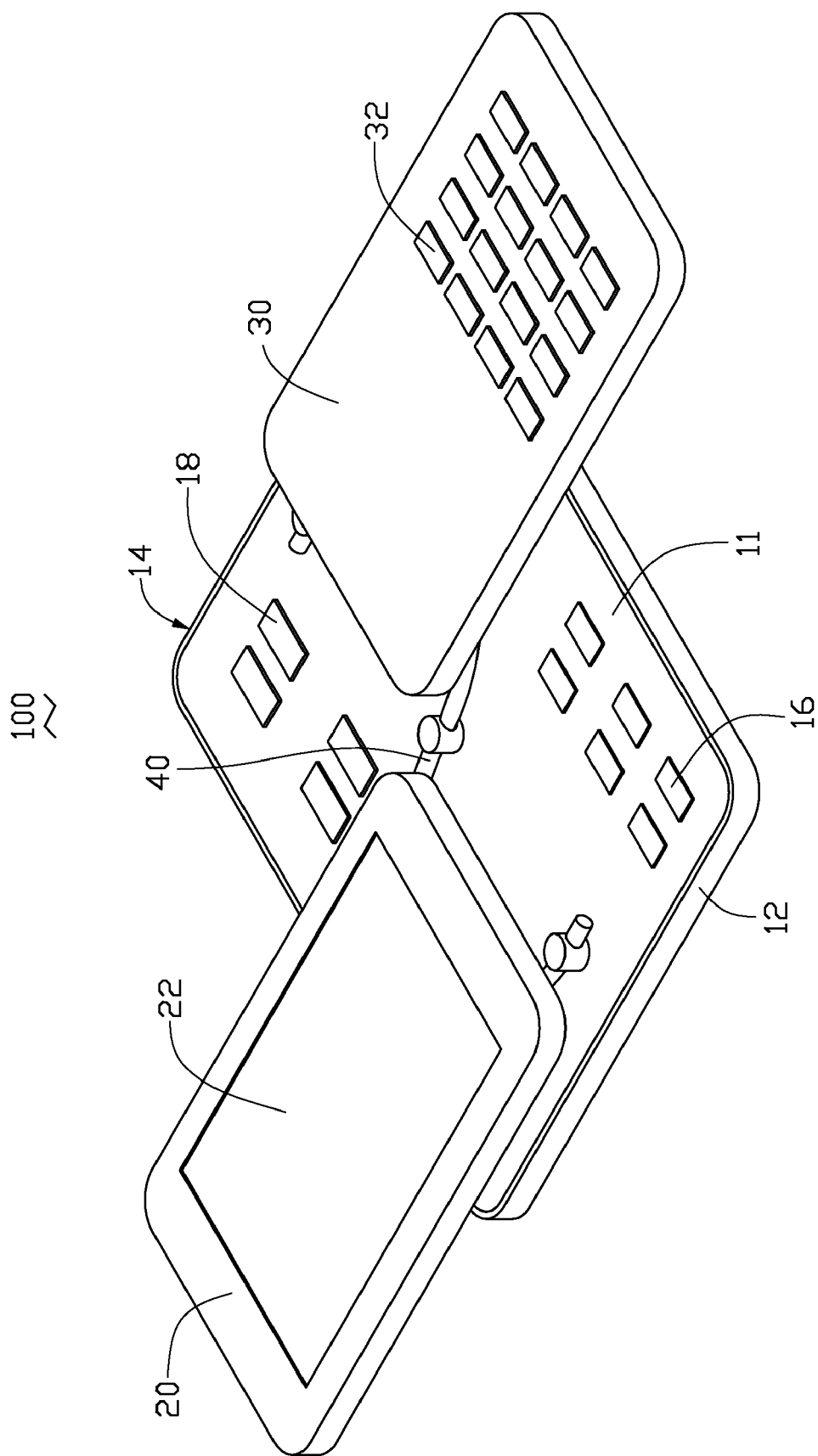
FIG. 2 is a perspective view showing the portable electronic device of FIG. 1, wherein the portable electronic device is in an opened status.

Referring to the FIGS. 1 and 2, an exemplary portable electronic device in the form of a mobile phone 100 includes a base 10, a first cover 20, a second cover 30, and a sliding mechanism 40. The base 10 has an upper surface 11. The first cover 20 aligns with the second cover 30 and both covers are slidably mounted on the upper surface 11 of the base 10 by the sliding mechanism 40.

The base 10 has a first side 12 and an opposite second side 14. A first keypad 16 and a second keypad 18 are positioned on the base 10. The first keypad 16 is adjacent to the first side 12. The second keypad 18 is adjacent to the second side 14.

The first cover 20 has a display unit 22 disposed thereon. When the mobile phone 100 is closed, the first cover 20 covers the first keypad 16.

The second cover 30 has a plurality of base keys 32 disposed thereon. When the mobile phone 100 is closed, the second cover 30 covers the second keypad 18.

Figure 3:
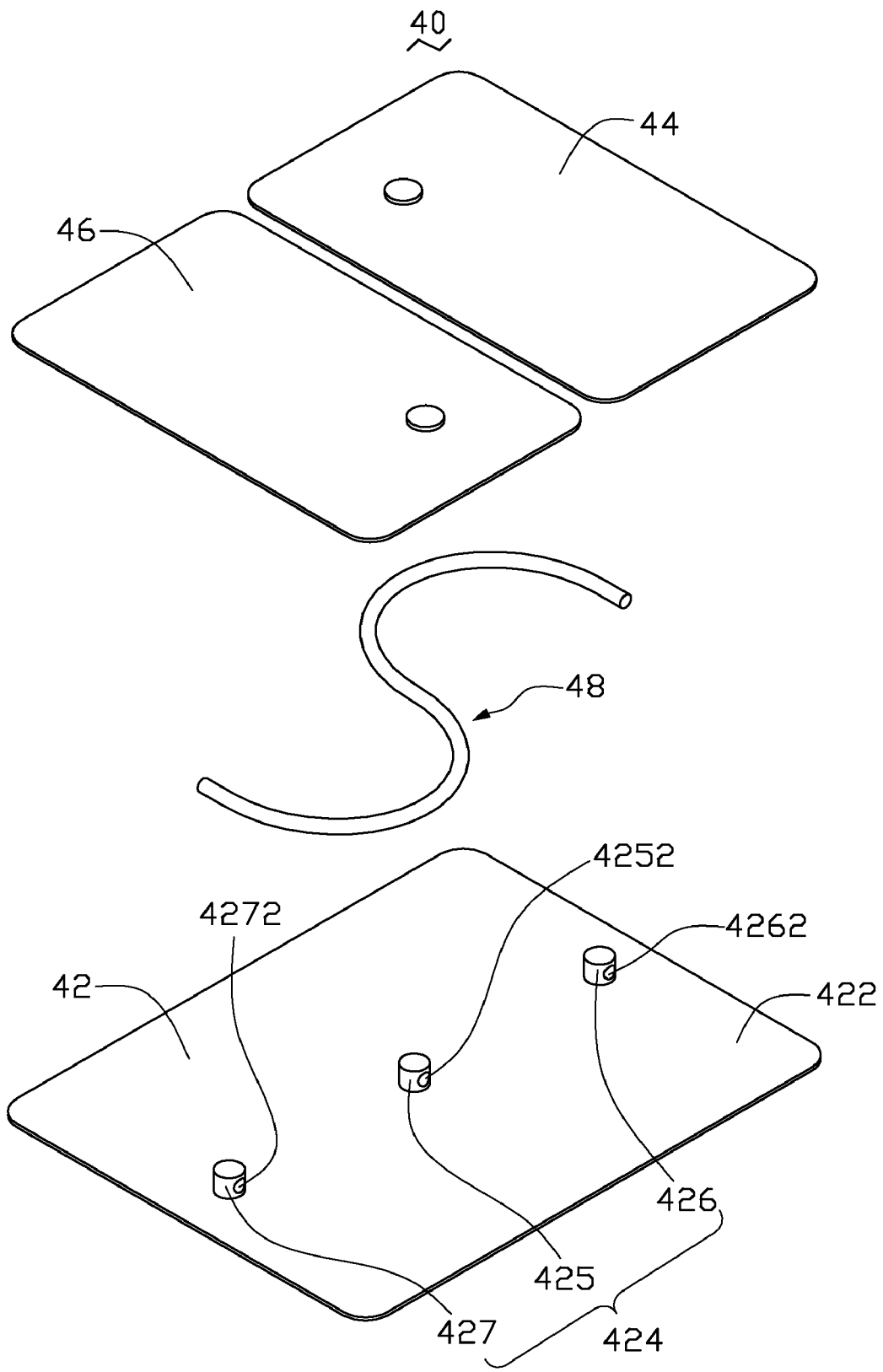
FIG. 3 is an enlarged and exploded view of the sliding mechanism shown in FIG. 1, showing one aspect thereof.
Figure 4:
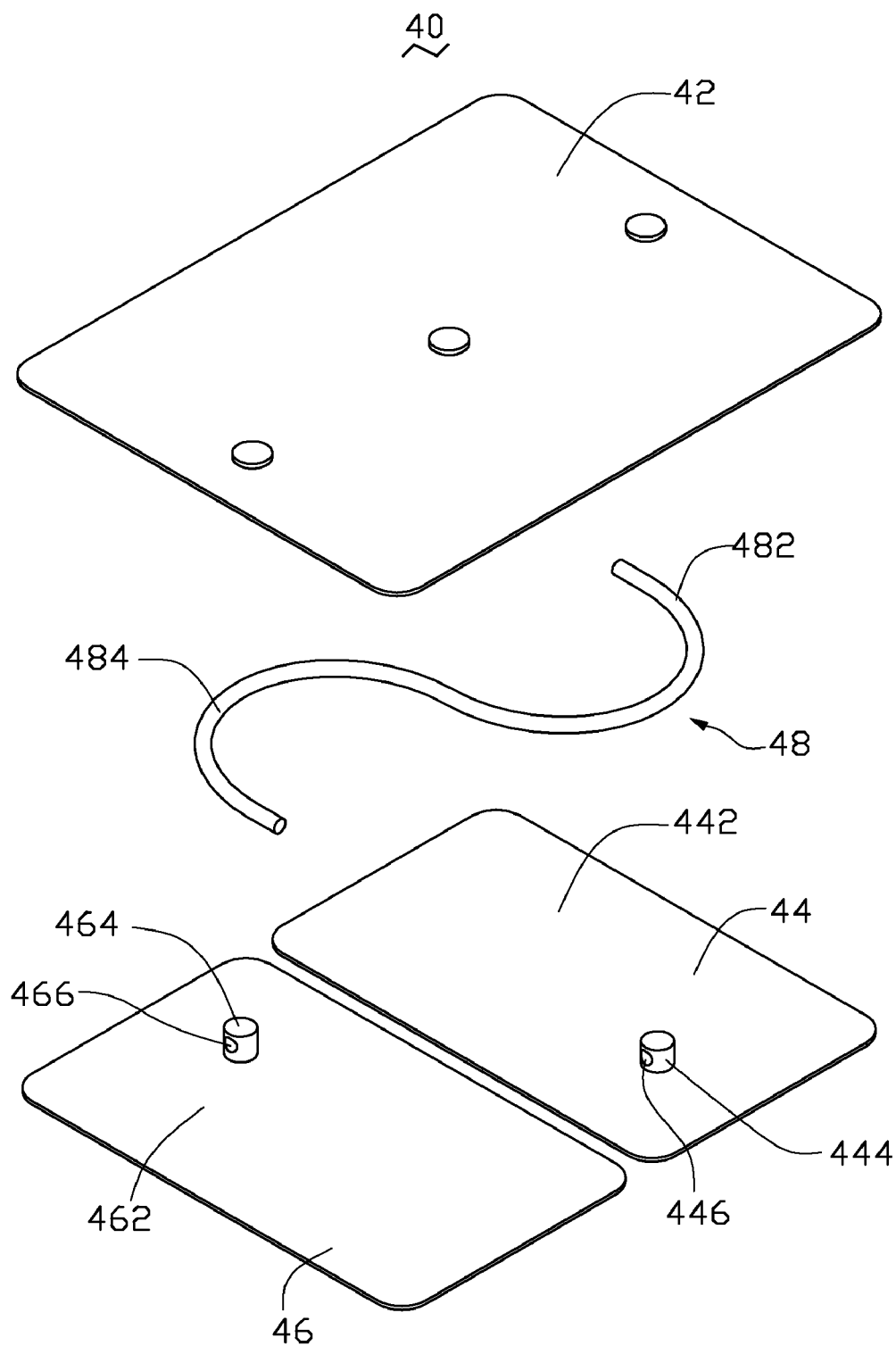
FIG. 4 is an enlarged and exploded view of the sliding mechanism shown in FIG. 1, showing another aspect thereof.

Referring to FIGS. 3 and 4, the sliding mechanism 40 includes a base plate 42, a first sliding plate 44, a second sliding plate 46, and an elastic element 48. The first sliding plate 44 aligns with the second sliding plate 46 and both sliding plates are slidably mounted on the base plate 42. The elastic element 48 provide elastic force for driving the first sliding plate 44 and the second sliding plate 46 to slide relative to the base plate 42.

The base plate 42 is substantially rectangular and has a first surface 422 facing the first sliding plate 44 and the second sliding plate 46. The base plate 42 is configured (e.g., structured or arranged) for securing to the base 10 of the mobile phone 100.

The base plate 42 has a rotation member 424, which includes a first rotating shaft 425, a second rotating shaft 426, and the third rotating shaft 427. The first rotating shaft 425 is located in a central portion of the base plate 42, the second rotating shaft 426 is located adjacent to a side of base plate 42, and the third rotating shaft 427 is located adjacent to the other side of the base plate 42. The first rotating shaft 425, the second rotating shaft 426, and the third rotating shaft 427 lie along a common axis.

Each of the first rotating shaft 425, the second rotating shaft 426 and the third rotating shaft 427 can rotate relative to the base plate 42. One end of the first rotating shaft 425 extends from the first surface 422 of the base plate 42 and defines a first mating hole 4252. One end of the second rotating shaft 426 extends from the first surface 422 of the base plate 42 and defines a second mating hole 4262. One end of the third rotating shaft 427 extends from the first surface 422 of the base plate 42 and defines a third mating hole 4272.

Referring further to the FIG. 4, the first sliding plate 44 is substantially rectangular and has a second surface 442 facing the base plate 42. The first sliding plate 44 has a first connecting shaft 444 disposed thereon. When the first sliding plate 44 is assembled with the base plate 42, the first connecting shaft 444 is located between the first rotating shaft 425 and the second rotating shaft 426. One end of the first connecting shaft 444 extends from the second surface 442 of the first sliding plate 442 and defines a first orifice 446. The first orifice 446 is configured for receiving the elastic element 48 therein. The first sliding plate 44 is configured for securing to the first cover 20.

The second sliding plate 46 is substantially rectangular and has a third surface 462 facing the base plate 42. The second sliding plate 46 has a second connecting shaft 464 disposed thereon. When the second sliding plate 46 is assembled with the base plate 42, the second connecting shaft 464 is located between the first rotating shaft 425 and the third rotating shaft 427. One side of the second connecting shaft 464 extends from the third surface 462 of the second sliding plate 46 and defines a second orifice 466. The second orifice 466 is configured for receiving the elastic element 48. The second sliding plate 46 is configured for securing to the second cover 30.

The elastic element 48 is substantially S-shaped and includes a first elastic portion 482 and a second elastic portion 484. Each of the first elastic portion 482 and the second elastic portion 484 is a semicircular arc.

Figure 5:
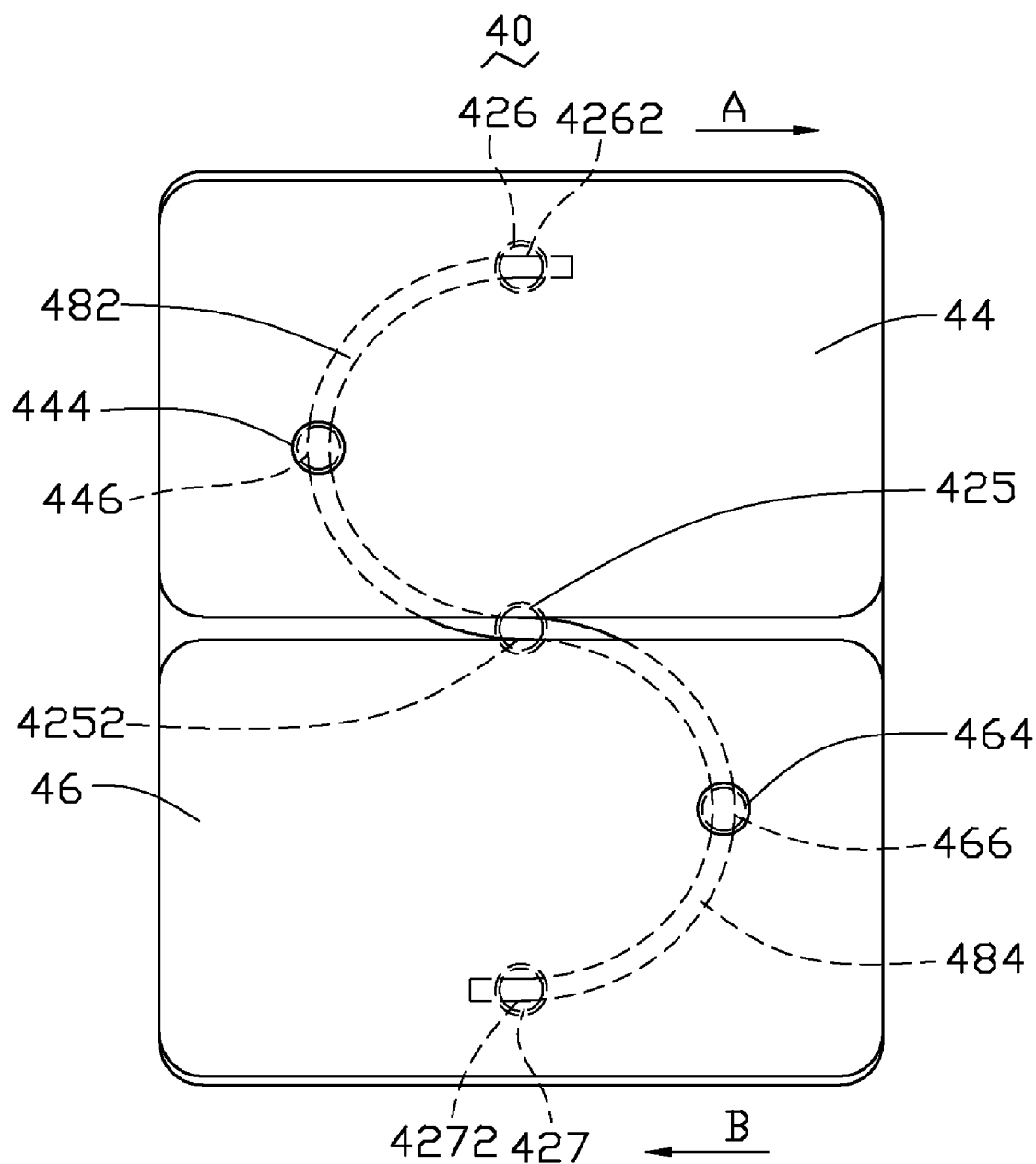
FIG. 5 is a schematic, perspective view of the sliding mechanism show in FIG. 3, wherein the sliding mechanism is closed.

Referring to FIG. 5, the elastic element 48 has one side received in the second mating hole 4262 of the second rotating shaft 426, the other side received in the third mating hole 4272 of the third rotating shaft 427, and a center portion of the elastic element 48 is received in the first mating hole 4252 of the first rotating shaft 425, thus, the elastic element 48 is secured with the base plate 42. The center portion of the first elastic portion 482 is received in the first orifice 446 of the first connecting shaft 444. Thus, the elastic element 48 is secured with the first sliding plate 44. The center of the second elastic portion 484 is received in the second orifice 466 of the second connecting shaft 466. Thus, the elastic element 48 is also secured with the second sliding plate 46.

Figure 6:
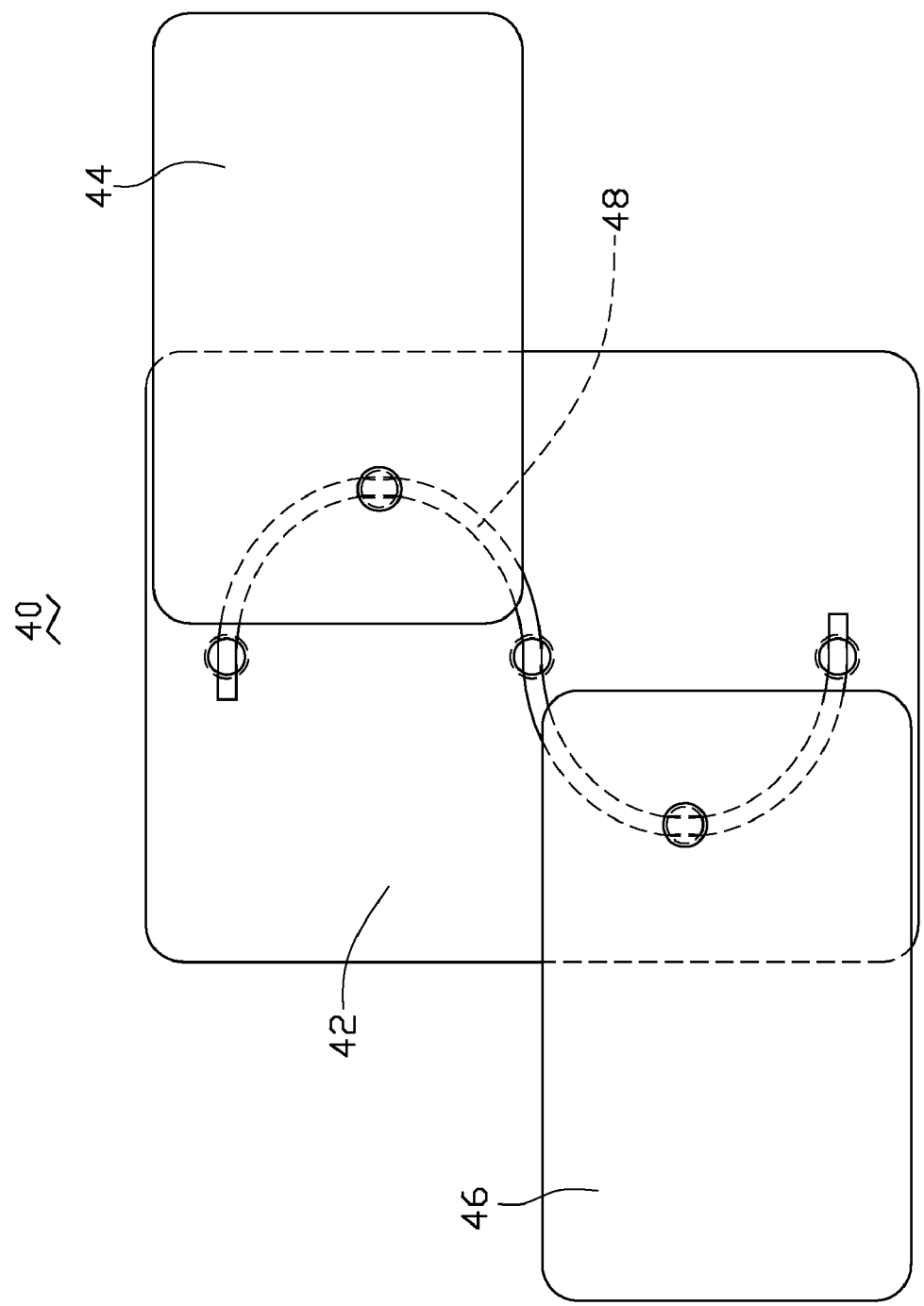
FIG. 6 is a schematic, perspective view of the sliding mechanism show in FIG. 5, wherein the sliding mechanism is open.

When the sliding mechanism 40 is used, the first sliding plate 44 can be pushed along the direction of arrow A by an external force. Then, the first connecting shaft 444 drives the first elastic portion 482 in the direction of arrow A and the first elastic portion 482 is compressed. When the first connecting shaft 444 passes the connecting line between the first rotating shaft 425 and the second rotating shaft 426, the outer force for driving the first sliding plate 44 stops. During such stage, the first sliding plate 44 continues to move respectively by the expansion force of the first elastic portion 482 until reaching the position shown in FIG. 6. Similarly to the first sliding plate 44, the first sliding plate 46 can be pushed along the direction of arrow B by an external force, thus the second connecting shaft 464 drives the second elastic portion 484 in the direction of arrow B, and the second elastic portion 484 is compressed. When the second connecting shaft 464 passes the connecting line between the first rotating shaft 425 and the third rotating shaft 427, the outer force for driving the first sliding plate 44 stops. The second sliding plate 46 continues to move respectively by the expansion force of the second elastic portion 484, until reaching the position shown in FIG. 6, i.e., the sliding mechanism 40 is in an opened status.

As the first cover 20 and the second cover 30 slide to the opened status, and sections of the upper wall 11 adjacent to the first side 12 thereof and the second side 14 thereof are exposed, thus the first keypad 16 and the second keypad 18 are exposed, to meet the requirement of having many additional keys for accessing additional functionality.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
    a base plate, the base plate comprising a first rotating shaft, a second rotating shaft and a third rotating shaft;
    a first sliding plate slidably mounted on the base plate and the first sliding plate located adjacent to one side of the base plate, and the first sliding plate having a first connecting shaft located between the first rotating shaft and the second rotating shaft;
    a second sliding plate slidably mounted on the base plate, and the second sliding plate located adjacent to an opposite side of the base plate, and the second sliding plate having a second connecting shaft located between the first rotating shaft and the third rotating shaft; and
    an elastic element providing force for driving the first sliding plate and the second sliding plate to slide relative to the base plate and in parallel and opposite directions with each other,
    wherein the first connecting shaft and the second connecting shaft are positioned on opposite sides of an axis along which the first rotating shaft, the second rotating shaft, and the third rotating shaft lie, the elastic element is substantially S-shaped and is fixed to the second rotating shaft, the first connecting shaft, the first rotating shaft, the second connecting shaft, and the third rotating shaft in turn.

2. The sliding mechanism as claimed in claim 1, wherein the base plate has a rotation assembly formed thereon for securing with a portion of the elastic element.

3. The sliding mechanism as claimed in claim 2, wherein the rotation assembly includes:
    a first rotating shaft mounted on a central portion of the base plate;
    a second rotating shaft mounted on one side of the base plate; and
    a third rotating shaft mounted on another side of the base plate.

4. The sliding mechanism as claimed in claim 3, wherein the first sliding plate has a first connecting shaft located between the first rotating shaft and the second rotating shaft, the second sliding plate has a second connecting shaft located between the first rotating shaft and the third rotating shaft, and the first connecting shaft and the second connecting shaft are positioned on opposite sides of an axis along which the first rotating shaft, the second rotating shaft, and the third rotating shaft lie, the elastic element is assembled with the second rotating shaft, the first connecting shaft, the first rotating shaft, the second connecting shaft, and the third rotating shaft.

5. The sliding mechanism as claimed in claim 4, wherein the first connecting shaft defines a first orifice for receiving the elastic element and the second connecting shaft defines a second orifice for receiving the elastic element.

6. The sliding mechanism as claimed in claim 3, wherein the first rotating shaft, the second rotating shaft, and the third rotating shaft lie along a common axis.

7. The sliding mechanism as claimed in claim 3, wherein the first rotating shaft defines a first mating hole for receiving the elastic element, the second rotating shaft defines a second mating hole for receiving the elastic element, the third rotating shaft defines a third mating hole for receiving the elastic element.

8. A portable electronic device, comprising:
    a base;
    a first cover;
    a second cover;
    a sliding mechanism configured for slidably mounting the first cover and the second cover on the base, which comprises a base plate having a first surface, and the base plate comprising a first rotating shaft, a second rotating shaft and a third rotating shaft;
    a first sliding plate slidably mounted to the first surface, and the first sliding plate located adjacent to one side of the base plate, the first sliding plate secured to the first cover, and the first sliding plate having a first connecting shaft located between the first rotating shaft and the second rotating shaft;
    a second sliding plate slidably mounted to the first surface, and the second sliding plate located adjacent to an opposite side of the base plate, the second sliding plate secured to the second cover, and the second sliding plate having a second connecting shaft located between the first rotating shaft and the third rotating shaft; and an elastic element providing force for driving the first sliding plate and the second sliding plate to slide relative to the base plate in parallel and opposite directions with each other, wherein the first connecting shaft and the second connecting shaft are positioned on opposite sides of an axis along which the first rotating shaft, the second rotating shaft, and the third rotating shaft lie, the elastic element is substantially S-shaped and is fixed to the second rotating shaft, the first connecting shaft, the first rotating shaft, the second connecting shaft, and the third rotating shaft in turn.

9. The portable electronic device as claimed in claim 8, wherein the base plate has a rotation assembly formed thereon for securing with a portion of the elastic element.

10. The portable electronic device as claimed in claim 9, wherein the rotation assembly includes:
   a first rotating shaft mounted on a central portion of the base plate;
   a second rotating shaft mounted on one side of the base plate; and
   a third rotating shaft mounted on another side of the base plate.

11. The portable electronic device as claimed in claim 10, wherein the first sliding plate has a first connecting shaft located between the first rotating shaft and the second rotating shaft, the second sliding plate has a second connecting shaft located between the first rotating shaft and the third rotating shaft, and the first connecting shaft and the second connecting shaft are positioned on opposite sides of an axis along which the first rotating shaft, the second rotating shaft, and the third rotating shaft lie, the elastic element is assembled with the second rotating shaft, the first connecting shaft, the first rotating shaft, the second connecting shaft, and the third rotating shaft.

12. The portable electronic device as claimed in claim 11, wherein the first connecting shaft defines a first orifice for receiving the elastic element and the second connecting shaft defines a second orifice for receiving the elastic element.

13. The portable electronic device as claimed in claim 10, wherein the first rotating shaft, the second rotating shaft, and the third rotating shaft lie along a common axis.

14. The portable electronic device as claimed in claim 10, wherein the first rotating shaft defines a first mating hole for receiving the elastic element, the second rotating shaft defines a second mating hole for receiving the elastic element, the third rotating shaft defines a third mating hole for receiving the elastic element.

15. A sliding mechanism, comprising:
   a base plate, the base plate comprising a first rotating shaft, a second rotating shaft and a third rotating shaft, the second rotating shaft and the third rotating shaft being respectively located at opposite sides of the first rotating shaft;
   a first sliding plate slidably mounted on the base plate in a first direction, and the first sliding plate having a first connecting shaft located between the first rotating shaft and the second rotating shaft;
   a second sliding plate slidably mounted on the base plate in a second direction parallel and opposite to the first direction, and the second sliding plate having a second connecting shaft located between the first rotating shaft and the third rotating shaft; and
   an elastic element providing force for driving the first sliding plate and the second sliding plate to slide relative to the base plate;
   wherein the first connecting shaft and the second connecting shaft are positioned on opposite sides of an axis along which the first rotating shaft, the second rotating shaft, and the third rotating shaft lie, the elastic element is substantially S-shaped and is fixed to the second rotating shaft, the first connecting shaft, the first rotating shaft, the second connecting shaft, and the third rotating shaft in turn.

16. The sliding mechanism as claimed in claim 15, wherein the first connecting shaft defines a first orifice for receiving the elastic element and the second connecting shaft defines a second orifice for receiving the elastic element.

17. The sliding mechanism as claimed in claim 15, wherein the first rotating shaft defines a first mating hole for receiving the elastic element, the second rotating shaft defines a second mating hole for receiving the elastic element, the third rotating shaft defines a third mating hole for receiving the elastic element.

* * * * *